Patented July 15, 1941

2,249,536

UNITED STATES PATENT OFFICE 2,249,536

REVERSIBLE GEL COMPOSITIONS OF POLY-
VINYL ALCOHOL AND HYDROXY ARO-
MATIC COMPOUNDS AND THEIR PREPA-
RATION

Wendell H. McDowell and William O. Kenyon,
Rochester, N. Y., assignors to Eastman Kodak
Company, Rochester, N. Y., a corporation of
New Jersey No Drawing. Application February 12, 1940, Se-
rial No. 318,551. In Great Britain February
14, 1939

9 Claims. (Cl. 252—316)

The invention relates to the preparation of reversible gels by gelling polyvinyl alcohol with an unsubstituted hydroxy aromatic compound and the reversible gels prepared therefrom.

The term "polyvinyl alcohol" as used herein is to be understood as referring to polymers in which at least 50% thereof is composed of vinyl alcohol constituent. It refers to polymers all of which are composed of vinyl alcohol units and also to polymers containing not only vinyl alcohol units but also vinyl acetate (and/or propionate and/or butyrate) units providing the vinyl alcohol units make up at least 50% of the polymer.

Ordinarily polyvinyl alcohol is a water-soluble material and does not show the properties of a gel under ordinary conditions. Therefore, polyvinyl alcohol does not usually find use where continuous contact with water is involved as it has no permanence in such a situation.

One object of our invention is to treat polyvinyl alcohol with a hydroxy aromatic compound so as to convert it into a rigid gel which has thermal-reversible properties. Another object of our invention is to prepare a product from polyvinyl alcohol, having gel characteristics, so that it may be used instead of gelatin or other like materials for the various purposes in which those materials are used.

We have found that when polyvinyl alcohol is mixed with the required amount of an unsubstituted dihydric phenol, trihydric phenol, alpha-naphthol or dihydric naphthol, or their mixture, the polyvinyl alcohol forms an opaque white gel which is firm and strong. We have found that the product so prepared is reversible, namely, the gel is converted to a liquid upon heating, but is reformed upon cooling the liquid. This is true even though the gel has been subjected to a washing with water which would remove gelling agent which is not bound to or adsorbed by the polyvinyl alcohol. If the gel is subjected to so much washing that some of the required gelling agent is removed an additional amount of gelling agent may be added to the gel by warming and then allowing to set again by cooling. We have found that polyvinyl alcohol may be gelled by means of the gelling agents specified whether it is of high, medium or low viscosity or regardless of its molecular weight. The gelling agent may be incorporated directly into an aqueous solution of the polyvinyl alcohol or may be dissolved in water or in some cases in dilute alkali before adding thereto. Upon standing a polyvinyl alcohol gel is formed which can be redispersed upon heating.

The proportion of gelling agent employed may be varied depending on the conditions present. For instance, polyvinyl alcohol has been gelled with gelling agents specified herein in proportions from 2% up (based on the weight of the polyvinyl alcohol) in preparing gels in accordance with our invention, although with the lower proportions of gelling agents, soft gels are obtained. The proportion of gelling agents, which is most desirable to use, depends on the temperature of gelling desired for the product formed, the viscosity of the polyvinyl alcohol, the concentration of the polyvinyl alcohol and the particular gelling agent which is used. With higher viscosity polyvinyl alcohols, the proportion of gelling agent need not be as great as with the lower viscosity polyvinyl alcohols to cause gelling within a time which would be practical.

The proportion of gelling agent also depends on the agent itself and on the hardness or firmness desired for the gel. For instance, if a polyvinyl alcohol having a molecular weight of 19,800 (a value obtained from viscosity measurements) is used in an aqueous solution containing 5.6% by weight of polyvinyl alcohol, and 8.8% of alpha-naphthol, based on the weight of the polyvinyl alcohol is added thereto and the mass is allowed to stand, a firm opaque, white gel is formed which forms a sol upon heating but gels again at 20° C. If only 4.4% of alpha-naphthol is used, a gel is obtained at a lowered temperature between 11° and 15° C. If only 2.2% of alpha-naphthol is used, a gel is obtained at approximately 3° C. With less than 2% of alpha-naphthol, no appreciable gelling occurs at a temperature of 0° C. or more. The gels prepared using the lower amounts of gelling agent are softer, the degree of firmness depending on the proportion of the particular gelling agent used.

A gelling agent, such as resorcinol, is effective but requires a larger proportion to cause the same degree of gelling as alpha-naphthol. For instance, if an aqueous solution of polyvinyl alcohol (prepared from polyvinyl acetate having a viscosity of 15 secs.) containing 7% of polyvinyl alcohol is mixed with 50% of resorcinol (based on the weight of the polyvinyl alcohol) a rigid opaque gel is quickly obtained at room temperature. With the use of less resorcinol, such as down to 25%, the gelling is naturally not as rapid while with a greater proportion of gelling agent, the gelling occurs more rapidly. With a lesser concentration of polyvinyl alcohol, other things being equal, it is desirable, as a rule, that a greater concentration of gelling agent be used for the same speed of gelling. Also, with the use of polyvinyl alcohols prepared from lower viscosity polyvinyl acetates, other things being equal, the use of a greater concentration of gelling agent is desirable to give the same speed of gelling or, as an alternative, the mass may be cooled to facilitate the formation of the gel.

Where the purpose is to form a firm, rigid gel of polyvinyl alcohol at room temperature using an aqueous solution of polyvinyl alcohol (molecular weight 19,800) of 5.6% concentration the proportion of the gelling agent employed should be at least roughly in the following proportions, based on the weight of the polyvinyl alcohol.

|  | Per cent |
|---|---|
| Dihydric phenols | 40 |
| Trihydric phenols | 30 |
| Alpha-naphthol | 8 |
| Dihydroxy-naphthalenes | 3.5 |

These values are indicative and may vary within the individual group from one compound to another. As pointed out above if the concentration of polyvinyl alcohol is greater, less gelling agent is required and vice versa. Also a polyvinyl alcohol of increased viscosity or higher molecular weight requires a lesser proportion of gelling agent.

The gelling agents herein are not limited as to the upper limit of the proportion which may be employed. For purposes of economy the use of not more than 200%, based on the weight of polyvinyl alcohol, is ordinarily preferred. For convenience of operation, the range of 3–7% for the concentration of polyvinyl alcohol in water is preferred for the polyvinyl alcohols usually used. These polyvinyl alcohols are ordinarily of a viscosity which gives a molecular weight of approximately 6700–19,800. With higher viscosity polyvinyl alcohols concentrations of less than 3% might be desirable, while with lower viscosity polyvinyl alcohols, a concentration of more than 7% might be employed.

The presence of alkali in the gelling of polyvinyl alcohol with hydroxy aromatic compounds decreases the efficiency of the gelling action. Therefore it is preferred that alkali be absent in gelling polyvinyl alcohol in accordance with our invention. The presence of an excessive amount of alkali prevents gelling. The amount of alkali present, if any, should be considerably less than that which will combine with all of the hydroxyl groups of the hydroxy aromatic compounds.

The monohydric phenols which are ordinarily regarded as representative of the hydroxy aromatic compounds have no gelling action on polyvinyl alcohol and, therefore, it would be expected that all of the hydroxy aromatic compounds are unsuitable for this purpose. However, we have found that the following hydroxy aromatic compounds are effective gelling agents for polyvinyl alcohol when mixed therewith in the amounts indicated herein: The unsubstituted dihydric phenols, such as resorcinol, catechol and hydroquinone, the unsubstituted trihydric phenols, such as pyrogallol, 2-hydroxy hydroquinone and phloroglucinol, unsubstituted alpha-naphthol or the unsubstituted dihydric naphthols, such as:

1,4 dihydroxy naphthalene
1,7 dihydroxy naphthalene
1,8 dihydroxy naphthalene
2,6 dihydroxy naphthalene
2,7 dihydroxy naphthalene
2,3 dihydroxy naphthalene
1,3 dihydroxy naphthalene The following examples illustrate the gelling of polyvinyl alcohol with an unsubstituted hydroxy aromatic compound in accordance with our invention:

*Example I*

A solution of .2 gram of catechol dissolved in 5 cc. of water was stirred into 5 cc. of a 5% aqueous solution of a polyvinyl alcohol of medium viscosity. The solution was allowed to stand and in a short time the formation of a rigid white gel was noted. If a homogeneous solution is not obtained, such as might result from premature separation out of the gel, the system should be warmed such as to about 40° C. and the suspended gel may thereby be redissolved. Another procedure to assure avoidance of premature gelling is warming the solutions before mixing them together and then causing the formation of a gel by lowering the temperature. A gel was obtained in this instance which formed a sol upon heating and upon cooling the gel again formed. Regardless of the number of times of heating and cooling, the formation of sol and gel will take place each time.

*Example II*

Example I was repeated except that resorcinol was employed instead of catechol. A white, opaque gel quickly formed which redispersed upon heating the solution. Upon cooling, the gel was again obtained.

*Example III*

Example I was repeated except that hydroquinone was employed instead of catechol. An opaque gel was obtained by allowing the mass to stand at room temperature, but a longer time was required for gel formation than in Examples I and II. The gel was reversible in that it formed a sol at elevated temperatures and reverted to a gel again upon cooling.

*Example IV*

A hydrolyzed polyvinyl acetate composed of 18.6% vinyl acetate and 81.4% vinyl alcohol was dissolved in warm water and resorcinol was added until the resin precipitated from solution. Upon cooling a stiff gel formed which dedissolved on heating. Coatings from this composition were unusually flexible.

*Example V*

A hydrolyzed polyvinyl acetate composed of 9.5% vinyl acetate and 91.5% of vinyl alcohol was dissolved in water and only so much alpha-naphthol as would produce a gel at room temperature was added. Upon warming the gel went into solution but was reformed upon cooling.

*Example VI*

1.2 grams of phloroglucinol was added to an aqueous solution containing 5.6% by weight of polyvinyl alcohol of medium viscosity, while the solution was at a temperature of 70° C. The mass was examined after it had cooled to room temperature and a firm, white reversible gel had formed.

Example VII

.6 gram of 2,7-dihydroxy naphthalene was added to an aqueous solution containing 5.6% by weight of polyvinyl alcohol of medium viscosity, while the solution was at a temperature of 90° C. The mass was examined after it had cooled to room temperature and a firm, white, reversible gel was obtained. The procedure was repeated using .1 gram of the 2,7 dihydroxynaphthalene. The mass was found to gel at room temperature.

The gels obtained in accordance with our invention may be used for various purposes. For instance, they may be used for photographic emulsions as the protective colloid for silver halide as described and claimed in Lowe application Serial No. 318,559 filed of even date. When colored, and in the form of sheeting, these gels may be used for safelights or for light filters in photographic apparatus. Other uses to which these gels may be put are subbing layers in photographic film, overcoatings or backings for film, as adhesives, thickening agents, or sizings for paper or cloth, or for use in coating compositions. These gels, particularly after they have been coated out into sheet form, may be hardened such as by treating with formaldehyde, bichromates, chrome alum or diketones. If desired, plasticizers may be incorporated in the gels, particularly if the formation of flexible sheeting therefrom is contemplated. Some of the plasticizers which may be employed are ethylene glycol, glycerol or monoacetin. The sheeting may be prepared by coating out the sol on to a film-forming surface and allowing it to solidify or gel followed by drying.

As pointed out previously, gels may be prepared using either polyvinyl alcohol or polyvinyl compounds, containing a sufficient proportion of hydroxyl groups, so as to be a polyvinyl alcohol for all practical purposes. The criterion as to whether a hydrolyzed polyvinyl ester may be employed as the polyvinyl alcohol is whether or not it is soluble in water. If the polyvinyl ester containing a large proportion of hydroxyl groups is soluble in water, a rigid, opaque gel may be formed therefrom in accordance with our invention.

All of the polyvinyl esters of the lower fatty acids containing at least 50% of vinyl alcohol are suitable for use as the starting material in our invention. These water-soluble polyvinyl esters, such as polyvinyl acetate may be prepared by hydrolyzing the polyvinyl ester with hydrochloric acid and water as described in U. S. Patent No. 1,971,951 of Skirrow and Morrison until the resin has a vinyl alcohol content of at least 50%. It is to be noted that the gelled polyvinyl alcohol in accordance with our invention, has advantages over natural products in that a resin of definite purity can be obtained and the treatment with the gelling agent can be standardized in contrast to natural products whose properties may vary markedly, due to the difference in different batches of the material. Therefore, the gelled polyvinyl alcohol in the various uses given lends itself to standardization in those processes. The gels are obtained in opaque form in the gelling process of our invention but give clear coatings when dried in layer form.

We claim:

1. A firm, thermal-reversible gel composed of polyvinyl alcohol mixed with a gelling amount of an unsubstituted hydroxy aromatic compound selected from the group consisting of the unsubstituted polyhydric phenols, unsubstituted α-naphthol and the unsubstituted dihydric-naphthols.

2. A firm, thermal-reversible gel composed of polyvinyl alcohol mixed with a gelling amount of a polyhydric phenol.

3. A firm, thermal-reversible gel composed of polyvinyl alcohol mixed with a gelling amount of α-naphthol.

4. A firm, thermal-reversible gel composed of polyvinyl alcohol mixed with a gelling amount of a dihydroxy-naphthalene.

5. A method of preparing a thermal-reversible gel which comprises mixing an aqueous solution of polyvinyl alcohol with a gelling agent in a gelling amount selected from the group consisting of the unsubstituted polyhydric phenols, unsubstituted α-naphthol and the unsubstituted dihydric naphthols at a temperature at which the mixture retains its liquid form, and subsequently lowering the temperature to a point at which the formation of a gel occurs.

6. A method of preparing a thermal-reversible gel which comprises mixing an aqueous solution of polyvinyl alcohol with a polyhydric phenol in gelling amount at a temperature at which the mixture retains its liquid form and subsequently lowering the temperature to the point at which the formation of a gel occurs.

7. A method of preparing a thermal-reversible gel which comprises mixing an aqueous solution of polyvinyl alcohol with α-naphthol in gelling amount at a temperature at which the mixture retains its liquid form and subsequently lowering the temperature to the point at which the formation of a gel occurs.

8. A method of preparing a thermal-reversible gel which comprises mixing an aqueous solution of polyvinyl alcohol with resorcinol in gelling amount at a temperature at which the mixture retains its liquid form and subsequently lowering the temperature to the point at which the formation of a gel occurs.

9. A method of preparing a thermal-reversible gel which comprises mixing an aqueous solution of polyvinyl alcohol with 50-100% (based on the weight of the polyvinyl alcohol) of a gelling agent selected from the group consisting of the unsubstituted polyhydric phenols, unsubstituted α-naphthol and the unsubstituted dihydroxy-naphthalenes at a temperature at which the mixture retains its liquid form and subsequently lowering the temperature to a point at which the formation of a gel occurs.

WENDELL H. McDOWELL.
WILLIAM O. KENYON.